ELECTRIC COUNTING AND INTEGRATING SYSTEM

Filed March 15, 1945 5 Sheets-Sheet 1

Inventor
ERNST H. KRAUSE

By Ralph L Chappell
Attorney

Sept. 16, 1952 E. H. KRAUSE 2,610,793

ELECTRIC COUNTING AND INTEGRATING SYSTEM

Filed March 15, 1945 5 Sheets-Sheet 2

Inventor

ERNST H. KRAUSE

By Ralph L Chappell

Attorney

Sept. 16, 1952 E. H. KRAUSE 2,610,793

ELECTRIC COUNTING AND INTEGRATING SYSTEM

Filed March 15, 1945 5 Sheets-Sheet 3

Inventor
ERNST H. KRAUSE

By Ralph L. Chappell

Attorney

Sept. 16, 1952 E. H. KRAUSE 2,610,793

ELECTRIC COUNTING AND INTEGRATING SYSTEM

Filed March 15, 1945 5 Sheets-Sheet 4

Inventor
ERNST H. KRAUSE

By Ralph L Chappell

Attorney

ELECTRIC COUNTING AND INTEGRATING SYSTEM

Filed March 15, 1945 5 Sheets-Sheet 5

Inventor
ERNST H. KRAUSE

By Ralph L. Chappell
Attorney

Patented Sept. 16, 1952

2,610,793

UNITED STATES PATENT OFFICE 2,610,793

ELECTRIC COUNTING AND INTEGRATING SYSTEM

Ernst H. Krause, Cheverly, Md.

Application March 15, 1945, Serial No. 582,964

9 Claims. (Cl. 235—92)

(Granted under the act of March 3, 1883, as amended April 30, 1928; 370 O. G. 757)

This invention relates in general to an electronic indicator and in particular to an electronic means for performing integration.

In electronic counting circuits, the application of an electrical impulse to the circuit input causes a change in the electrical state which exists within the circuit. If a succession of such electrical impulses are applied to the input, each one causes a change in the electrical state within the circuit, so that determination and interpretation of the final electrical state existing within the circuit will provide an integration of the impulses applied to the circuit input. Therefore in performing integration with the aid of an electronic counting circuit, a means for indicating the several electrical states which may exist within the circuit becomes a primary consideration.

It is an object of this invention to provide an electronic circuit which performs absolute and direct integration of a succession of electrical impulses applied thereto.

Another object of this invention is to provide a means for indicating directly the electrical state which exists within an electronic counting circuit.

Another object of this invention is to provide a means which automatically integrates the results obtained by impressing an electrical impulse or plurality of such electrical impulses on an electronic counting circuit.

Another object of this invention is to provide a means for indicating when certain of several preselected points within an electrical circuit, which are alternating between two distinct voltage levels in a predetermined relationship, are at the same potential.

Other objects and features of this invention will become apparent upon a careful consideration of the following detailed description, when taken together with the accompanying drawings.

Fig. 1 is a circuit diagram illustrating one embodiment of this invention.

Fig. 1*a* is a diagram illustrating a variation in the method of making certain of the connections shown in Fig. 1.

Figures 1, 1A:
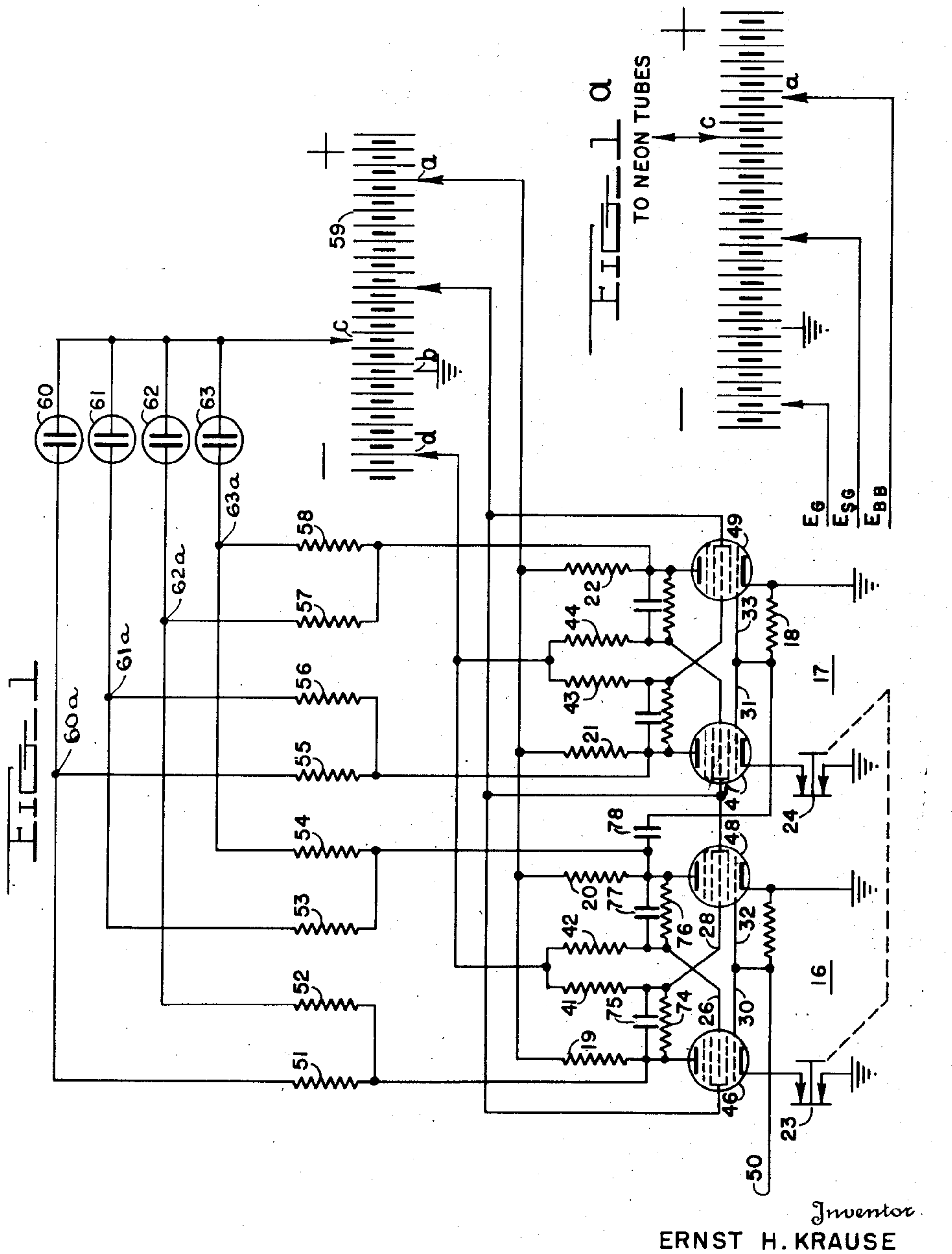

Reference is now had in particular to Fig. 1, wherein there is shown one form of an electronic integrating circuit constructed according to the teachings of this invention. This circuit comprises a plurality of gas type indicator tubes 60, 61, 62 and 63, shown in general in the upper portion of the drawing, and a scale-of-four type of counter circuit shown in the lower portion of the drawing. The latter comprises a pair of conventional type of scale-of-two counter stages, 16 and 17, connected in cascade. The first stage 16 consists of a pair of multigrid tubes 46 and 48, connected so that the output from tube 46 is coupled through resistance 74 shunted by capacitor 75 to the second grid 28 of tube 48, while the output of tube 48 is coupled through resistance 76 shunted by capacitor 77 to the second control grid 26 of tube 46. In the second counter stage 17, which consists of tubes 47 and 49, the corresponding tube elements are connected in the same manner as in the first stage 16. In this way each stage is directly connected in a regenerative manner so that one tube in each stage will be conducting and the other tube non-conducting and in which condition the stage will remain until it receives some small electrical disturbance. Whereupon, this disturbance will be regeneratively amplified until the conditions of the stages are reversed. The plate of each tube in the circuit is connected through a respective resistance 19, 20, 21 and 22 to a positive point, designated as "*a*", on the supply battery 59, while the second control grids of the tubes are connected through respective resistances 42, 41, 44 and 43 to a negative point "*d*" on the same battery. The input to the first stage 16 may be obtained from any convenient external source, not shown, but connected to point 50 and applied in parallel to the first control grids 30 and 32, while the input to the second stage 17 is obtained from the plate of tube 48 and applied in parallel to the first control grids 31 and 33 of tubes 47 and 49 through a low time constant coupling circuit consisting of condenser 78 and resistance 18. The function of this coupling circuit is to apply to the first control grids 31 and 33 of the second stage 17 a negative pulse each time tube 48 passes from non-conduction to conduction and a positive pulse each time it passes from conduction to non-conduction.

By constructing a counter circuit with multigrid tubes arranged as shown, each stage is made to respond only when a negative impulse is applied to its first control grids, so a total of four negative impulses are required at input 50 to cause the circuit to pass through a complete cycle of operation. In tracing a cycle of operation, the original or zero state of the circuit may be set by opening the cathode switches 23 and 24 which render tubes 46 and 47 non-conducting and consequently tubes 48 and 49 conducting. The switches 23 and 24 are then closed. Then in response to the first negative input pulse applied to point 50, tubes 47 and 48 are made non-conducting and tubes 46 and 49 are made conducting. In response to the second negative input pulse tubes 46 and 49 are made non-conducting and tubes 47 and 48 are made conducting. In response to the third negative input pulse tubes 48 and 49 are made non-conducting and 46 and 47 are made conducting. Finally in response to the fourth negative input pulse tubes 46 and 47 are made non-conducting and tubes 48 and 49 are made conducting thereby completing the cycle of operation for the circuit. Thus it is seen that a counter of this type consisting of two stages has four stable states in which it may exist. Similarly a scale-of-two type of counter chain consisting of three stages would have 8 states, a counter of four stages would have 16 stable states and in general a counter of $n$ stages would have $2n$ stable states.

In each of these states half of the tubes in the circuit will be conducting and half will be non-conducting. The plate potential of the non-conducting tubes will be at some voltage substantially equal to the potential at tap "*a*" on the supply battery 59, while the plate potential of the conducting tubes will be at some voltage substantially equal to ground. Thus as a tube passes from conduction to non-conduction its plate voltage will vary from ground to "*a*."

Figure 2:
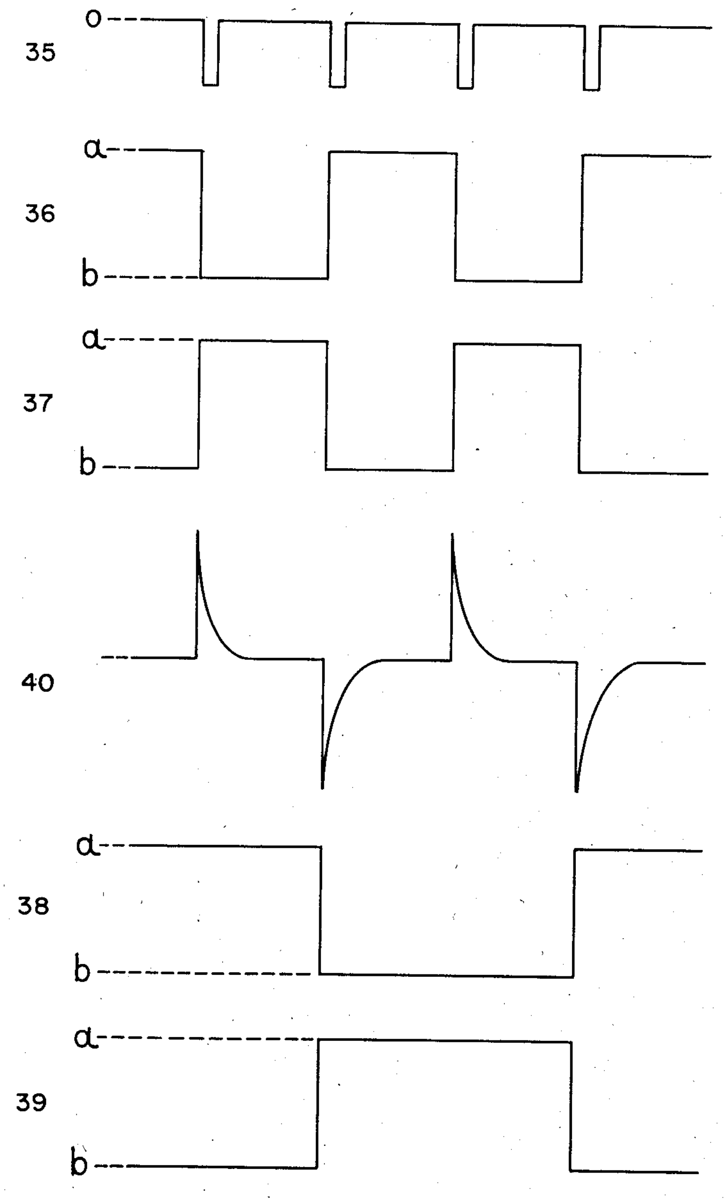
Fig. 2 is a series of waveforms referred to in explaining the operation of the circuits shown in Fig. 1.

In Fig. 2 several waveforms are plotted in such a maner that the voltage is represented along the vertical coordinate and time along the horizontal coordinate. Herein wave form 35 is representative of a series of negative input pulses applied to the input 50. Waveforms 36 and 37 represent respectively the change in plate voltage for tubes 46 and 48 in response to the input waveform 35. Waveform 40 represents the input to tubes 47 and 49 and waveforms 38 and 39 represent respectively the change in plate voltage for tubes 47 and 49 in response to the waveform 40.

For purposes of indicating the state of the counter circuit and therefore to provide an integration of the input pulses, there is provided, as indicated in the upper portion of Fig. 1, a plurality of neon tubes 60, 61, 62 and 63. The number of neon tubes needed to perform a complete integration of the results, corresponds to the number of states which may exist in the electronic counter. In the present illustration four neon tubes are required since a scale-of-four counter is shown. One electrode of each of the neon tubes is commonly joined to a point of positive potential, designated as tap "*c*" on the supply battery 59. The position of this tap is such that it requires the full difference in voltage between taps "*a*" and "*c*" to cause the neon tubes to glow. Any lesser voltage difference such as that which exists between tap "*c*" and ground or "*a*/2" and "*c*" as hereinafter described will not be sufficient to break the tubes down.

The other electrode of each neon tube is connected through a separate current limiting resistance to a predetermined point in each counter stage. As here shown, neon tube 60 is connected to the plates of tubes 46 and 47 through the respective current limiting resistances 51 and 55. Neon tube 61 is connected to the plates of tubes 47 and 48 through the respective current limiting resistances 56 and 53. Neon tube 62 is connected to the plates of tubes 46 and 49 through the respective current limiting resistances 52 and 57. Neon tube 63 is connected to the plates of tubes 48 and 49 through the respective current limiting resistances 54 and 58. In this arrangement it should be pointed out that all of the current limiting resistances 51 through 58 are equal in size and the points in the respective counter stages to which they are connected vary in potential with the operation of the counter in such a manner that only during one state in the cycle of counter operation will the voltage at the upper juncture point 60*a*, 61*a*, 62*a* and 63*a* of any pair of resistances attain a high enough potential to cause the neon tube to which it is connected to glow.

With zero state existing, the plate potentials of tubes 46 and 47 are at *a* and the plate potentials of tubes 48 and 49 are at *b*. By symmetry, the potential at the juncture 63*a* of resistors 54 and 58 is *b*. The potential across neon tube 63 therefor, is the difference between potentials *b* and *c* which is incapable of supporting glow discharge and neon tube 63 remains darkened. Also by symmetry, the potential existing at the juncture 62*a* of resistors 52 and 57 and at the juncture 61*a* of 53 and 56 is the average of potentials *a* and *b*. The difference between this average and potential *c* is insufficient to support glow discharge and neon tubes 61 and 62 remain darkened. Also by symmetry, the potential at the juncture 60*a* of resistors 51 and 55 can go as high as potential *a* with the result that only neon tube 60 glows when the counter circuit is in the zero state. This signifies directly to the observer, without need of interpretation, that zero pulses have been applied to input 50 of Fig. 1. Upon the arrival of the first pulse, the first state is initiated and tubes 46 and 49 conduct while tubes 47 and 48 become non-conducting. During this state, therefore, only neon tube 61 can glow. This signifies directly to the observer, without need of interpretation, that one pulse has been applied to input 50 of Fig. 1. Similarly, tubes 46 and 49 are non-conducting during the second state which is initiated by the arrival of the second pulse. This means that only neon tube 62 glows. The sequence of operations thereby established carries on through subsequent pulses in such a fashion that only one neon tube glows during a given state and a different neon tube glows for each state. The count of pulses is therefore direct reading and the indicator system completely integrates the counter results.

In Fig. 1*a* there is shown an alternate method of establishing potential *c* to which the common electrodes of the neon tubes are connected. In this case, potential *c* is almost equal to potential *a* so that neon tubes will fire only when connected to plate potentials all of which are at ground potential which corresponds to the conducting tube condition.

Figure 3:
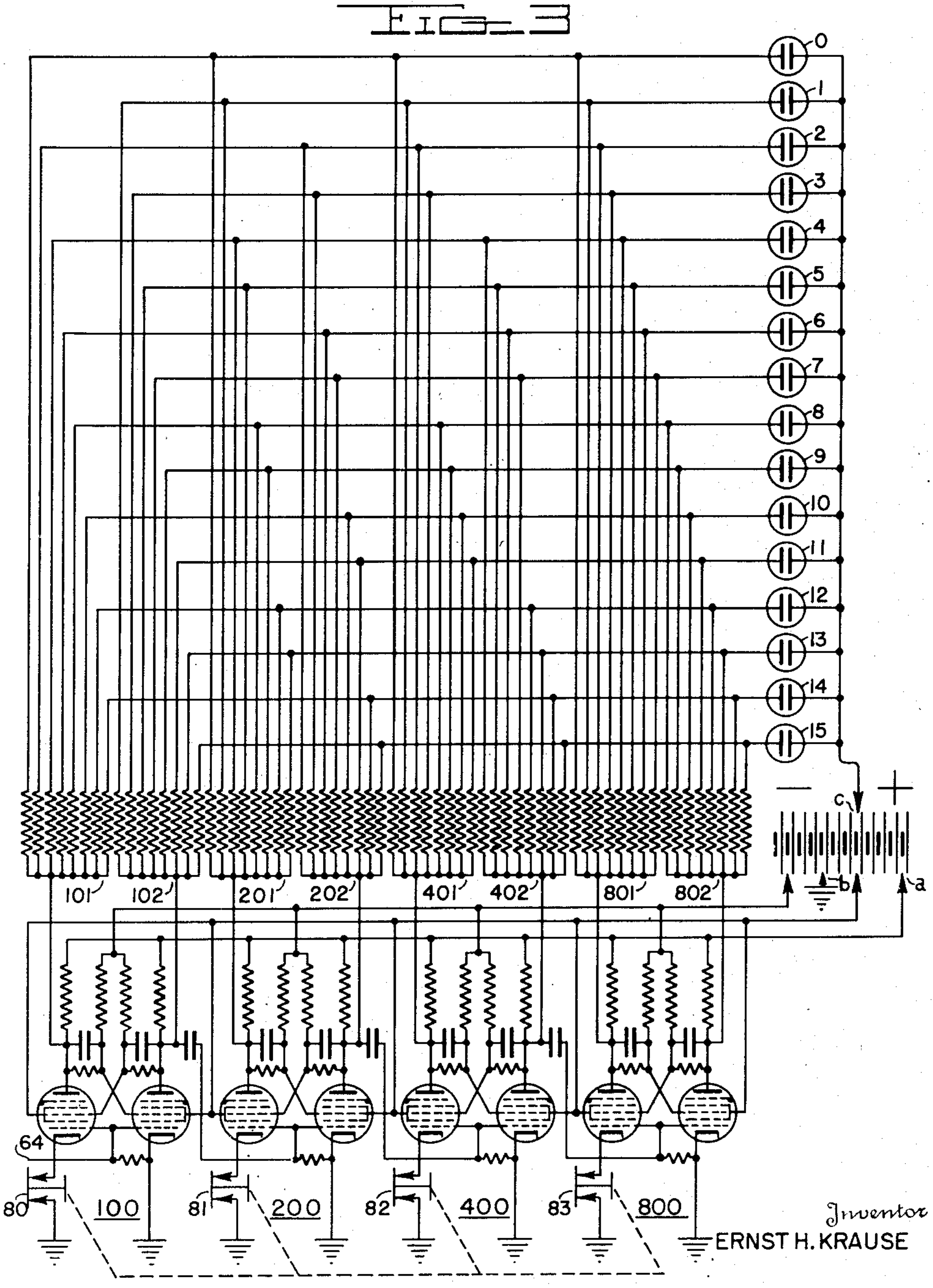
Fig. 3 is a circuit diagram of an embodiment of this invention similar to that shown in Fig. 1, except that the application to a four stage rather than a two stage electronic counter is illustrated.

In Fig. 3, the invention is shown as applied to an electronic counter of four stages 100, 200, 400 and 800.

Figure 4:
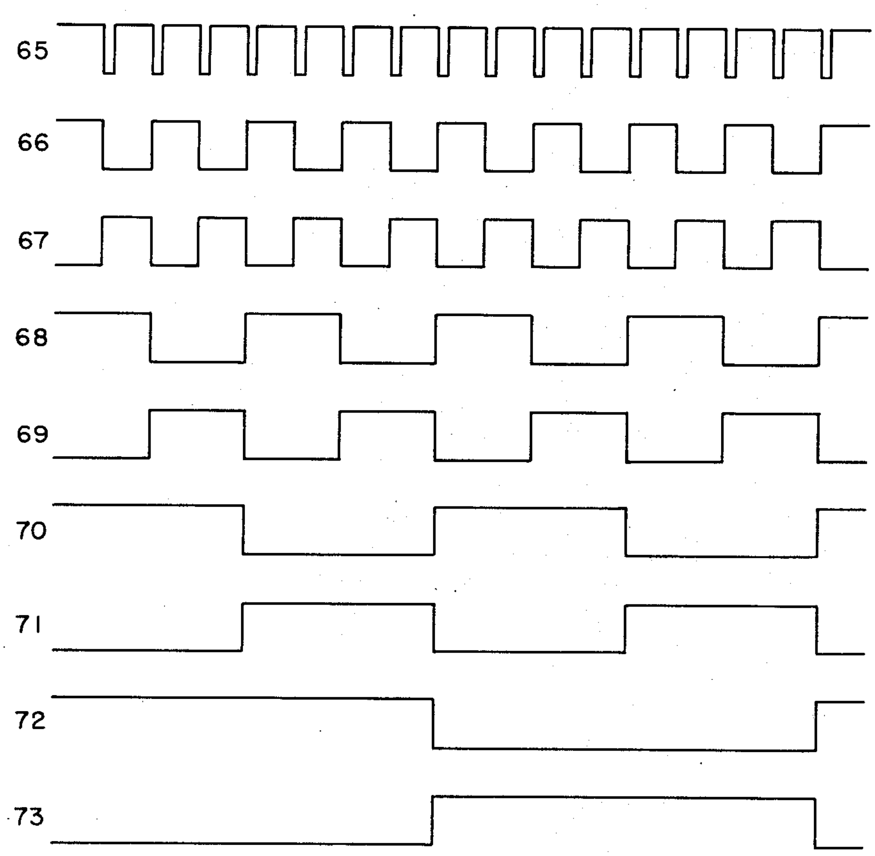
Fig. 4 is a series of waveforms referred to in explaining the operation of the circuit shown in Fig. 3.

The sequence of operations in this circuit may be traced by reference to the waveforms shown in Fig. 4. Waveform 65 is representative of a series of pulses applied to the input 64 of the counter circuit. Waveforms 66 through 73 represent the plate potentials at junctions 101, 102, 201, 202, 401, 402, 801 and 802 respectively in response to the input waveform 65. It will be seen that the potential across the neon tube 1 will be a maximum after the arrival of the first pulse, that the potential across neon tube 2 will be a maximum after the arrival of the second pulse, and that the potential across neon tube 11 will be a maximum after the arrival of the eleventh pulse. Likewise, the potential across any of the neon tubes in the arrangement will be a maximum after the arrival of the pulse corresponding to its number. Thus each neon tube glows in its proper turn giving a direct reading of the pulse count and eliminating the interpretation required by conventional indicators. It will readily be seen that the limit of the number of stages to which this exact form of the invention may be applied is fixed by the difference between the potential at which available neon tubes breakdown or fire and the lowest potential at which glow discharge can be maintained. For example, in Fig. 3, in the zero state of the counter which may be set by opening cathodes switches 80, 81, and 82 and 83 together, the junctions 101, 201, 401 and 801 are all at potential $a$ since the vacuum tubes to which they are connected are non-conducting. Neon tube 0 therefore glows signifying that the counter is in the zero state. When the first pulse is applied to the input, the vacuum tube to which 101 is connected starts to conduct while the vacuum tubes to which 201, 401 and 801 are connected remain non-conducting. This means that the potential applied to neon tube 0 has dropped only ¼ rather than ½ the difference in voltage between points $a$ and $b$ of the supply source as in the two stage case. This is because only one quarter of the junctions, namely junction 101, drops to ground potential out of the four junctions 101, 201, 401 and 801 whereas in the two stage case one half of the two junctions drop to ground potential. This reduced change in potential across neon tube 0 must be great enough to cause it to extinguish. Otherwise, both neon tubes 0 and 1 will glow and the system will no longer be direct reading. The extension of this invention beyond this particular limit set by available neon tubes is, however, a simple matter by means which are already known, such as booster tubes to increase potential differences, the use of other types of indicating tubes or meters more sensitive than neon tubes, and similar voltage responsive devices any of which will be known by persons versed in the art.

Figure 5:
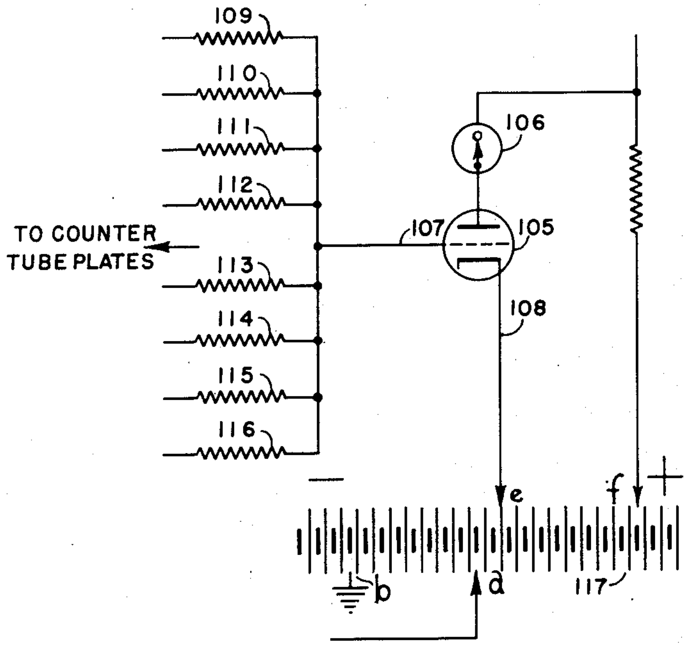
Fig. 5 is a circuit diagram illustrating a variation of the embodiments of this invention shown in Figs. 1 and 3.

Typical of such an extension and illustrative of the use of such voltage responsive devices is the circuit shown in Fig. 5. In this circuit vacuum tube 105 and current meter 106 together represent a voltage responsive device which gives a visual indication of current flow. If grid 107 of tube 105 be held at a potential below that of cathode 108 such that tube 105 is non-conducting, there will be no current flow through meter 106 and hence no indication. Tube 105 can be chosen so as to have sharp cut-off characteristics and so that only a small positive change in the potential at grid 107 spells the difference between no flow of current and a relatively high flow of current through meter 106. Grid 107 is shown as being connected to current limiting resistors 109 through 116. These current limiting resistors are those which would be connected to the plates of eight tubes comprising one half the tube complement of an eight stage, scale of 256 counter not shown. Each of said tubes would, of course, be in a different stage of the counter and it can be assumed that when all of the tubes to which resistors 109 through 116 are connected are in a non-conducting condition, as they will be only once during the entire 256 counter states, zero state exists and a potential corresponding to $a$ of battery 117 exists at grid 107 of tube 105. This, of course, represents the highest potential to which grid 107 can rise and corresponds, therefore, to the minimum bias condition during the operation of the counter. The potential $e$ at cathode 108 is so adjusted that, when grid 107 is at $a$ potential, tube 105 conducts strongly from plate to cathode but no grid current flows. This plate current flow through meter 106 causes the needle to deflect to a point marked 0 on the dial and the observer is thereby apprised of the fact that zero state exists. On the first step in the counter cycle one of the tubes to which grid 107 is connected becomes conducting and its plate falls to potential $b$ while the plate potentials of the other seven connected tubes remain at $a$. This results in a reduction in potential at grid 107 by ⅛ since only one of the eight tubes supplying the grid dropped in potential, and represents the least difference which can occur between zero state bias and the bias existing during any of the other 255 states of the counter. While this reduction may be only of the order of a few volts, it nevertheless is sufficient to place grid 107 far enough below cathode 108 in potential to stop the flow of plate current through tube 105. Hence, meter 106 no longer indicates that zero state exists since no current flows to cause needle deflection. For each of the 256 states of the counter, a voltage responsive device such as that shown in Fig. 5 is employed so as to provide complete integration of the eight stage counter circuit cycle. Except for special purposes, complete integration of such a large number of states would not be employed. In its stead, partial integration can be employed to advantage. The cascading of decade counters, with each integrated by means herein disclosed and the integrated result of each counter employed to indicate units, tens, hundreds, etc., on suitable means such as meters or the individual drums of a mechanical counter is an example of such partial integration. The particular type of electronic counter employed is not a limiting feature of this invention inasmuch as the integration depends only upon the existence of several points within the counter circuit which alternate between two distinct voltage levels in a pre-determined manner.

It goes without saying that the conditions being integrated by this invention may be secured from any point within the various stages which have two stable states. For example, the second grids of the various vacuum tubes are stable either at zero potential or below cut-off potential.

No attempt has been made to show a full exploitation of this device. Obviously, the integrated results obtained may be used not only for counting as such, but for such purposes as interval timing and auxiliary circuit triggering.

The arbitrary notation used herein of the various equilibrium states of a counter has a number of variations according to the user's particular needs and any of these may be selected without altering the application of the invention. In this connection it will be noted that push button switches 80 through 83 have been shown in the cathode connections of all left hand tubes of the counter circuit illustrated in Fig. 3. When these switches are opened momentarily, the left hand tubes become non-conducting and the counter is placed in zero state for the beginning of a new count. This is merely a convenient resetting means and has many possible variations both mechanical and electronic.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

I claim as my invention:

1. An electronic integrating circuit, comprising a plurality of the scale-of-two type counter stages connected to form a counter circuit in which a definite number of electrical states may exist, a plurality of voltage responsive devices, a plurality of impedance means separately connecting selected points in all of said counter stages to each of said voltage responsive devices, whereby each of said devices will respond to a different electrical state existing within said counter circuit.

2. An electronic integrating circuit, comprising a plurality of the scale-of-two counter stages connected to form a counter circuit in which a definite number of electrical states may exist, a plurality of gas type indicator tubes each having at least two electrodes, a plurality of impedance means separately connecting one of the electrodes of each of said indicator tubes to selected points in all of said counter stages, and means commonly connecting the other electrodes of all of said indicator tubes to a point of fixed potential so that only one of said indicator tubes will glow in response to any one particular electrical state existing within the counter circuit and each will glow in response to a different electrical state.

3. An electronic integrating circuit, comprising a plurality of the scale-of-two counter stages connected to form a counter circuit in which a definite number of electrical stages may exist, a plurality of gas type indicator tubes each having at least two electrodes, a plurality of resistance means separately connecting one of the electrodes of each of said indicator tubes to selected points in all of said counter stages, a source of fixed potential, and means commonly connecting the other electrode of all of said indicator tubes to a predetermined point on said fixed potential so that only one of said indicator tubes will glow in response to any one particular electrical state existing within the counter circuit and each will glow in response to a different electrical state.

4. An electronic integrating circuit, comprising a plurality of the scale-of-two type of counter stages connected to form a counter circuit in which a definite number of electrical states may exist, each of said counter stages comprising a pair of vacuum tubes having at least anode, cathode, and control grid electrodes, a plurality of gas type indicator tubes each having at least two electrodes, a plurality of resistance means separately connecting one of the electrodes of each of said indicator tubes to selected anodes in all of said counter stages, a source of fixed potential, and means commonly connecting the other electrode of all of said indicator tubes to a predetermined point on said fixed potential so that only one of said indicator tubes will glow in response to any one particular electrical state existing within the counter circuit and each will glow in response to a different electrical state.

5. In an electrical circuit having several voltage points which are alternating between two distinct voltage levels in a predetermined manner, a means for indicating when all of said points are at the same potential, comprising a voltage responsive device, separate impedance means connecting all of said points to said voltage responsive device, and means biasing said device so that it will respond only when the potentials at all of said points are equal to each other and to a predetermined one of said two distinct voltage levels.

6. In an electrical circuit having several voltage points which are alternating between two distinct voltage levels in a predetermined manner, a means for indicating when all of said points are at the same potential, comprising a gas type indicator tube having at least two electrodes, separate resistance means connecting all of said points to one of the electrodes of said tube, a source of fixed potential, and means for returning the other electrode of said tube to a point on said fixed potential such that said tube will glow when the potentials at all of said points are equal to each other and to a predetermined one of said two distinct voltage levels.

7. An electronic integrating circuit, comprising a plurality of the scale-of-two type counter stages connected to form a counter circuit in which a definite number of electrical states may exist, a plurality of voltage responsive devices, a plurality of resistance means separately connecting each of said voltage responsive devices to selected points in all of said counter stages and means biasing said voltage responsive devices so that each may respond when the said selected points to which it is connected are at the same preselected potential.

8. An electronic integrating circuit, comprising a plurality of the scale-of-two type counter stages connected to form a counter circuit in which a definite number of electrical states may exist, a plurality of vacuum tube components, a plurality of resistance means separately connecting each of said vacuum tube components to selected points in all of said counter stages, and means biasing said vacuum tube components so that each may respond when the said selected points to which it is connected are at the same predetermined potential.

9. In an electrical circuit having several voltage points which are alternating between two distinct voltage levels in a predetermined manner, a means for indicating when all of said points are at the same potential, comprising a vacuum tube component having a control grid therefor, separate means connecting all of said points to the control grid of said vacuum tube component and means so biasing said vacuum tube component that it will respond only when the potentials at all of said points are equal to each other and to a predetermined one of said two distinct voltage levels.

ERNST H. KRAUSE.

REFERENCES CITED

The following references are of record in the file of this patent:

UNITED STATES PATENTS

| Number | Name | Date |
|---|---|---|
| 2,158,285 | Koch | May 16, 1939 |
| 2,310,105 | Michel | Feb. 2, 1943 |
| 2,348,016 | Michel | May 2, 1944 |
| 2,381,920 | Miller | Aug. 14, 1945 |
| 2,407,320 | Miller | Sept. 20, 1946 |
| 2,436,963 | Grosdoff | Mar. 2, 1948 |

OTHER REFERENCES

"Proceedings of the Cambridge Philosophical Society"; E. C. Lewis, volume 33, 1937; pages 549–558.

"Review of Scientific Instruments"; Stevenson, vol. 8, November 1937; pages 414–416.

"Review of Scientific Instruments"; Lifschutz et al., vol. 9, March 1938; pages 83–89.

"Review of Scientific Instruments"; Johnson, vol. 9, July 1938; pages 218–223.

"Electronics"; Potter, June 1944; pages 110–113, 358, 360.

"Electronic Industries," Preset Internal Timer; Potter, July 1945; pages 97–99, 130, 134, 138, 142 and 146.

"Electronic Industries," Johnson, July 1945; pages 82–85, 178, 182, 186 and 190.